(No Model.)
J. H. WALSH.
APPARATUS FOR CARBONIZING CEMENT PIPES, &c.
No. 375,236. Patented Dec. 20, 1887.
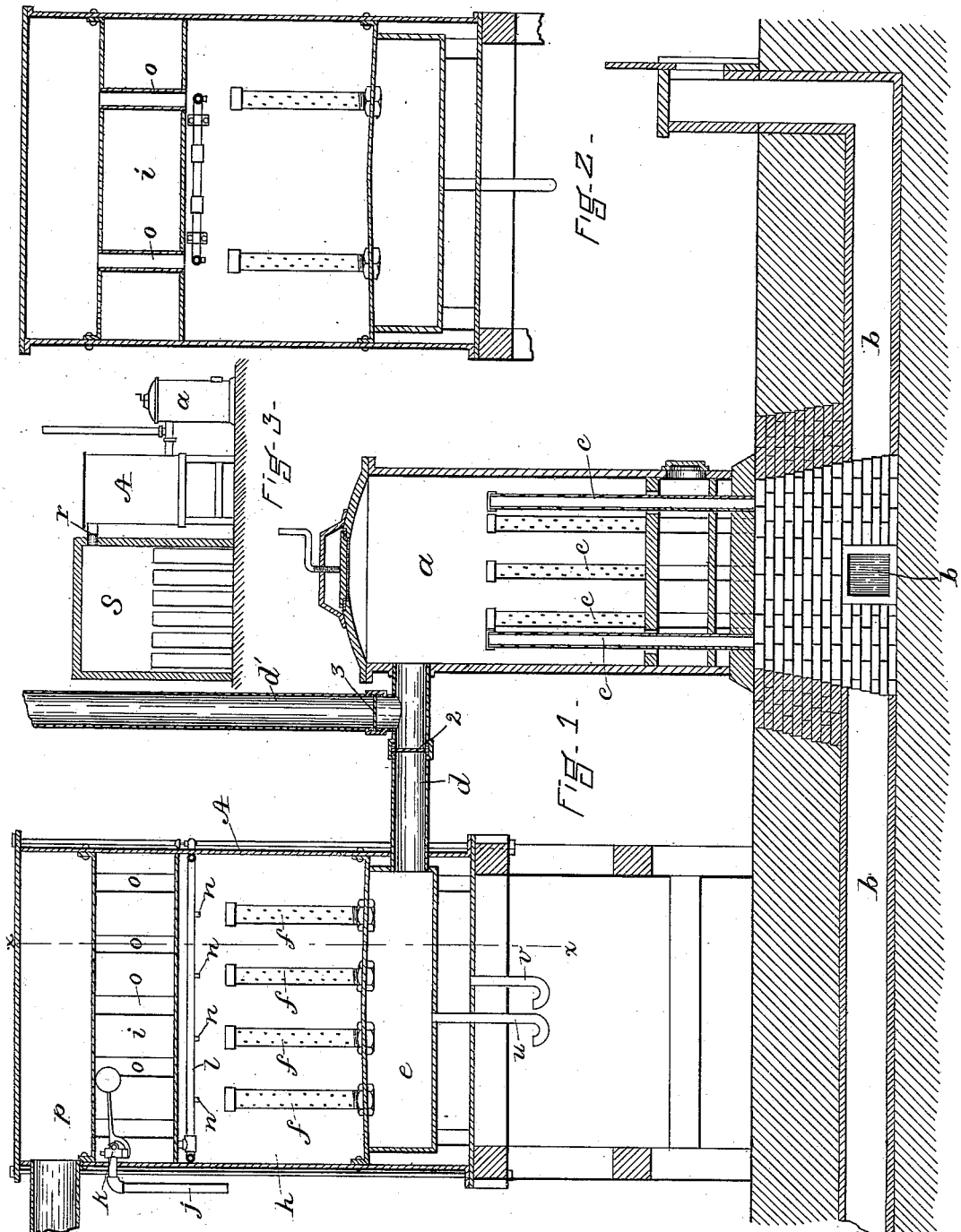

UNITED STATES PATENT OFFICE.

JOHN H. WALSH, OF BOSTON, MASSACHUSETTS.

APPARATUS FOR CARBONIZING CEMENT PIPES, &c.

SPECIFICATION forming part of Letters Patent No. 375,236, dated December 20, 1887.

Application filed June 25, 1887. Serial No. 242,448. (No model.)

*To all whom it may concern:*

Be it known that I, JOHN H. WALSH, of Boston, in the county of Suffolk and State of Massachusetts, have invented certain new and useful Improvements in Process of and Apparatus for Carbonizing Cement Pipes and other Articles, of which the following is a specification.

A limestone that contains more than ten per cent. of silica or clay, when burned in a kiln in a manner similar to which lime is burned, possesses the property of "setting" or becoming hard and stone-like when made into mortar by moistening with water and allowing to stand for some time. Limestone that possesses this property is called "cement." As there is but little limestone that contains enough silica to cause it to set, most cement is made artificially by mixing ground limestone and clay in the right proportions and burning the mixture in a common limekiln, which produces a compound capable of hardening upon moistening it with water and allowing it to remain undisturbed for several days. Now, the setting of cement is due to chemical and physical changes. In order to better understand these changes it will be well to look at the composition of cement. Portland cement contains: lime, 59.06 per cent.; silicic acid, 24.07 per cent.; alumina, 6.92 per cent.; oxide of iron, 3.41 per cent.; magnesia, 0.82 per cent.; potash, 0.73 per cent.; soda, 0.87 per cent.; sulphate of lime, 2.85 per cent.; clay and sand, 1.47 per cent.

It will be seen that cement contains a large amount of lime, which is, chemically speaking, an oxide of calcium, and when this substance is moistened and exposed to the air it slowly absorbs carbon dioxide and is converted into carbonate of calcium—

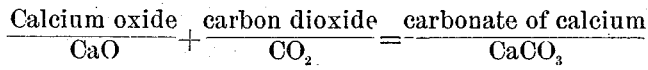

$$\frac{\text{Calcium oxide}}{\text{CaO}} + \frac{\text{carbon dioxide}}{\text{CO}_2} = \frac{\text{carbonate of calcium}}{\text{CaCO}_3}$$

Carbonate of calcium is also formed in another way: When water is added to cement, some of the oxide of calcium is dissolved, forming hydrate of calcium, and the carbon dioxide of the air, acting on the hydrate of calcium, forms carbonate of calcium. Cement also contains the alkaline silicates of sodium and potassium, and these, acting on the lime, form silicates of calcium. Another change is produced in the cement by the crystallizing of the hydrate of calcium. As the water holding hydrate of calcium in solution evaporates spontaneously the hydrate of calcium is deposited in crystals.

The changes enumerated cause the cement to "set;" but when carried on in the usual manner, by merely exposing to the air, the changes are very slow and imperfect. In view of this a process for the rapid and more perfect execution of the changes has been invented, and it is proposed to use this process in the manufacture of cement pipes for laying underground telegraph and telephone wires and for other purposes. The details of the process are as follows: Take the following ingredients, viz: sand, five parts; Portland cement, two and one-half parts; Rosendale cement, one and one-fourth part; sulphur, one and one-fourth part. These are mixed intimately with a small quantity of water—say twelve quarts to a two-hundred-and-eighty-pound pipe—and pressed into iron molds by a stamp striking one thousand five hundred pounds to the square inch. The sulphur is used to increase the non-conducting power of the pipes. The pipe is now removed from the mold and placed in a closed chamber, where it is treated with a water-saturated mixture of carbon dioxide and air for about seven days, when it is perfectly solidified and ready for use. It has been found convenient to prepare the carbon dioxide by the combustion of charcoal in a tight stove, the air for the combustion being furnished by a pipe which extends into the air outside of the building. The carbon-dioxide gas mixed with air is passed through a cooler in which the mixed air and gas is saturated with moisture, and from which it is conducted into the closed chamber containing the pipes. It is found needful to cool the gas, as when it is passed into the chamber hot it causes the pipes to crackle. The action in this closed chamber is similar to that described above as taking place in the air. The carbonate, hydrate, and silicate of calcium are formed, and thus the pipes are rapidly and perfectly hardened. The moisture with which the air and gas are charged comes in contact with all the surfaces of the pipes to be treated, and, dissolving some of the calcium oxide, forms calcium hydrate. The calcium hydrate is in turn acted on by the carbon dioxide, forming calcium carbonate.

The apparatus used in carrying out the above-described process is represented in Figures 1 and 2 of the accompanying drawings, forming a part of this specification, in which—

Fig. 1 represents a sectional view of the entire apparatus excepting the closed chamber which contains the pipes to be treated. Fig. 2 represents a section on line $x\ x$, Fig. 1. Fig. 3 represents a reduced side view of the apparatus shown in Fig. 1, connected with the receptacle for the pipes to be treated.

In the drawings, $a$ represents the closed furnace or stove, below which is an open space which receives outside air through trunks or flues $b\ b\ b$, and from which the air enters the combustion-chamber of the stove through perforated pipes $c\ c\ c$.

From the upper part of the combustion-chamber $a$ extends a flue, $d$, which conducts the gas and the air mixed therewith from the combustion-chamber to a chamber, $e$, in a casing, A, supported in convenient proximity to the stove and termed the "hot-gas chamber."

From the hot-gas chamber $e$ extend upwardly vertical pipes $f$, which are perforated above the chamber $e$ and permit the heated air and gas to escape into a compartment, $h$, of the casing. Above the compartment $h$ is a water-tank, $i$, which is kept supplied with water through a feed-pipe, $j$, having a ball-cock, $k$, which automatically regulates the supply of water. A pipe, $l$, from the tank has a series of small nozzles, $n$, arranged over the perforated pipes $f$, so that said nozzles deliver continuous streams of water upon the closed upper ends of said pipes. A part of the water thus delivered is converted into spray and a part flows down the outer surfaces of the pipes $f$. The water not only cools the warm air and gas passing through the perforated pipes $f$ into the compartment $h$, but also charges such air and gas with moisture.

From the compartment $h$ the air and gas pass through flues $o$, extending through the tank $i$ into a compartment, $p$, at the top of the casing, which compartment I term the "cold-gas chamber," and from thence through a flue, $r$, to the chamber $s$, containing the pipes to be treated. Said chamber is simply a close compartment of suitable size, preferably having the inner surface of its top or roof coated with sheet metal, on which a part of the moisture in the gas and air is condensed and from which the water of condensation falls upon the pipes below. The cooled and moisture-laden gas acts on all parts of the surfaces of the pipes, including the inner surfaces of the bores or orifices of the pipes, presenting the desired moisture alike to all parts of the pipes to which it has access.

Any water that may find access to the chamber $h$ is permitted to escape through a waste-pipe, $u$, having a bend at its lower end forming a trap to prevent the escape of gas. A similar pipe, $v$, serves in like manner to conduct away any water that may accumulate in the lower portion of the casing.

I prefer to provide two or more flues, $b$, for the supply of outside air to the combustion-chamber, said flues extending in different directions, as shown in Fig. 1, so that one flue can be opened and the other closed, according to the direction of the wind.

If preferred, the air can be supplied by a blower.

When the fire is first started, the products of combustion are shut off from the flue $d$ by a damper, 2, and escape through a flue, $d'$; but afterward the flue $d'$ is closed by a damper, 3, and the damper 2 is opened.

I claim—

1. The combination of the stove or furnace having a closed combustion-chamber and air-pipes entering the same, the casing communicating with the furnace and having the hot-gas chamber $e$, which first receives the heated air and gas from the furnace, the perforated pipes which conduct the air and gas from said chamber, and means, substantially as described, for charging the air and gas with moisture.

2. The combination, with the furnace having the combustion-chamber and air-supplying pipes, of the casing having the chamber $e$, communicating with the combustion-chamber, the perforated pipes $f$, the chamber $h$, the water-supplying nozzles over the pipes $f$, the cold-gas chamber $p$, and the carbonizing-chamber $s$, communicating with the chamber $p$, all arranged and operating substantially as set forth.

In testimony whereof I have signed my name to this specification, in the presence of two subscribing witnesses, this 8th day of June, A. D. 1887.

JOHN H. WALSH.

Witnesses:
C. F. BROWN,
A. D. HARRISON.